Patented June 21, 1938

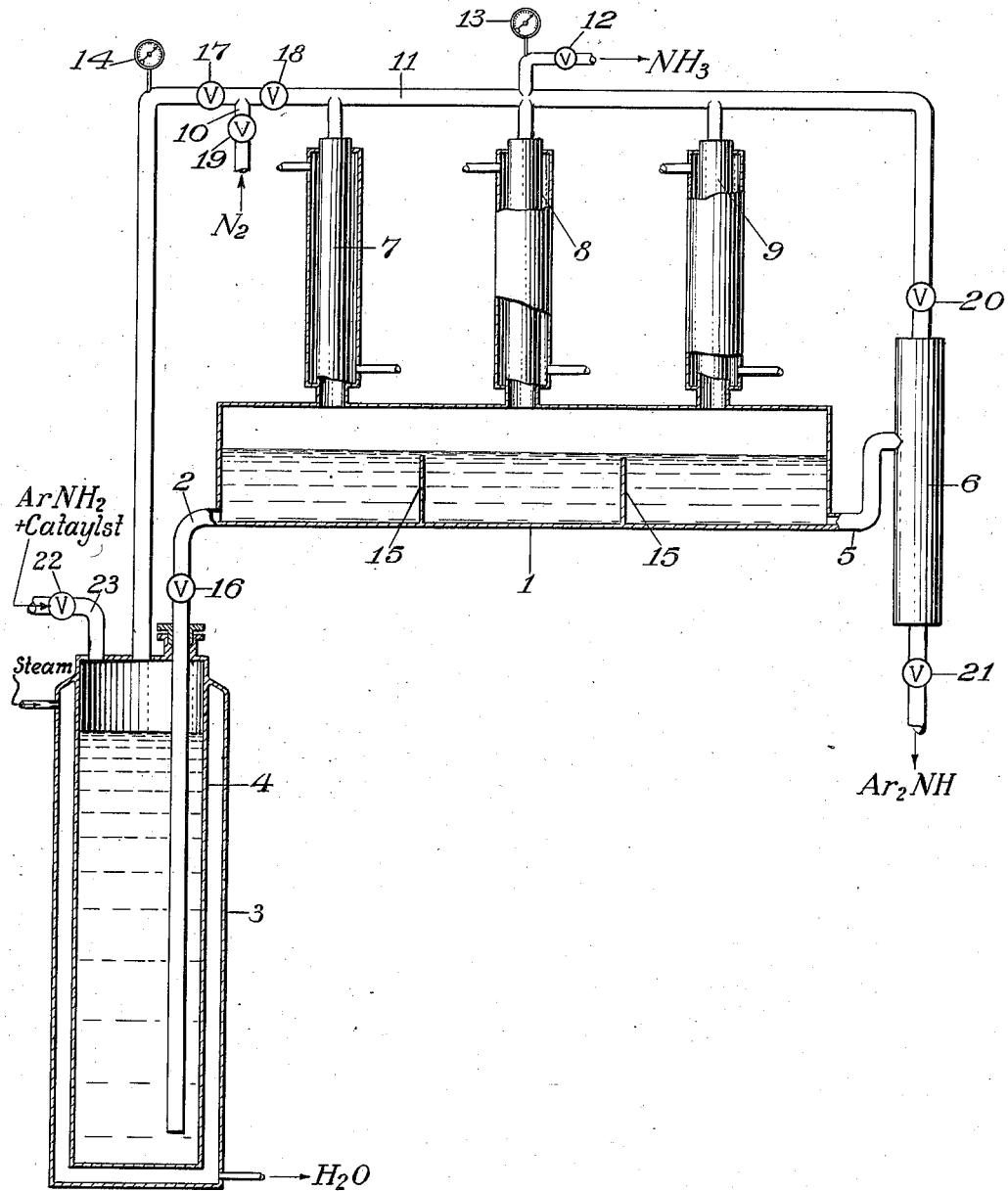

2,120,969

UNITED STATES PATENT OFFICE 2,120,969

PRODUCTION OF DIARYL AMINES

Marshall Francis Acken, Woodbury, N. J., assignor to E. I. du Pont de Nemours & Company, Wilmington, Del., a corporation of Delaware Application May 15, 1935, Serial No. 21,678

10 Claims. (Cl. 260—128)

The present invention relates to the production of diaryl amines generally, and more particularly to the production of diphenyl amine.

Diaryl amines generally, and diphenyl amine in particular, have usually been produced by a batch procedure, which involves heating the primary aromatic amine in the presence of a catalyst. Despite the many advantages inherent in a continuous process, this method of operation has not been successfully applied to the production of diaryl amines, partly because of the limitations of the catalysts heretofore available. These catalysts, though generally satisfactory, were somewhat sluggish in their effect, and some of them were insoluble in cold primary aromatic amines, for which reason a rapid homogeneous reaction suitable for a continuous process was not possible. In addition, the catalytic effect of these materials was at least partly destroyed in the equipment used.

In my copending application, Serial No. 21,677 filed May 15, 1935, several new and improved catalysts for the production of diaryl amines are disclosed. The catalysts therein described bring about a more rapid rate of reaction. Thus, a 40% yield of diphenyl amine may be obtained in two hours by the use of the preferred catalysts therein disclosed. In addition, the preferred catalysts, comprising approximately equimolar proportions of ferrous halides and aryl amine hydrohalides, are soluble in the cold reaction media, and therefore bring about a rapid, homogeneous reaction which lends itself readily to a continuous process.

The object of the present invention is a new and improved process for the production of diaryl amines. A further object is a continuous process for the production of diaryl amines. A still further object is a rapid, efficient continuous process for the production of diphenyl amine from aniline by means of an improved catalytic agent. Other objects will be apparent as the invention is hereinafter described.

I have found that the foregoing objects may be accomplished by the following invention, according to which a mixture of a primary aromatic amine and an appropriate catalyst are continuously passed through a reaction zone heated to the reaction temperature and maintained at supra-atmospheric pressures.

The catalyst chosen for this process may be any of the well known agents for this reaction, if desired. Thus, ammonium chloride, ammonium iodide, or ammonium bromide may be used. However, I prefer to employ the catalysts disclosed in my copending application above referred to. Specifically, I prefer to use a catalyst comprising equimolar proportions of ferrous chloride and an aromatic amine hydrochloride, since these catalysts produce a high yield of diaryl amine in a relatively short time, as, for example, in two hours. In addition, the material is soluble in cold primary aromatic amines, whereby a homogeneous condition obtains in the reaction mixture.

The temperature and pressure maintained in the reaction zone will, of course, depend upon various factors for each diaryl amine being produced. In general, however, the temperature and pressure are adjusted so that the optimum conditions are obtained in the reaction zone for the specific reaction being carried out therein. After the material has reacted, the reaction products are continuously removed and the diaryl amine is separated. If desired, the primary aromatic amine recovered at this point may be recycled in the process.

As is well known, the corrosion of equipment in which diaryl amines are made is very severe, and I have found that this corrosion is attended by a significant decrease in the yield of the reaction. Indeed, it appears that the corrosion of the equipment results in a destruction of one of the active ingredients of the catalyst. For this reason, I prefer to carry out my continuous process in corrosion-resistant equipment in order that this "negative catalytic effect" may be avoided and the effectiveness of the catalyst will remain substantially constant during the reaction period. I have found that equipment made of an alloy comprising chromium and molybdenum, or silver-, tantalum-, or enamel-lined equipment, is satisfactorily resistant to corrosion under these conditions.

In order to describe my invention more clearly, I shall refer to the attached diagram which illustrates a preferred embodiment thereof. It is to be understood that this is done solely by way of illustration, and is not to be regarded as a limitation upon the scope of my invention.

The diagram represents a longitudinal section of an apparatus adapted to the continuous production of diaryl amines generally. For the purpose of convenience, however, I shall describe the process with reference to the production of diphenyl amine. It is apparent, however, that the same process is equally applicable to the production of other diaryl amines.

Referring to the diagram, the apparatus comprises a long, tubular reaction vessel 1 of a corrosion-resistant alloy, as hereinbefore mentioned.

The reaction vessel is connected at one end, through the line 2, with a steam-jacketed pressure storage vessel 3, which is provided with an enamel-lined insert 4, and a charging line 23. The reaction vessel 1 is connected at the other end, through the line 5, to a trap 6 for removing the reaction products. The reaction vessel 1 is also provided with a series of reflux columns 7, 8 and 9. The entire system is maintained at supra-atmospheric pressure by supplying nitrogen at the point 10 in the line 11, connecting the reflux columns 7, 8, and 9, the removal trap 6, and the storage vessel 3. This line is also provided with an ammonia release valve 12 and the pressure gauges 13 and 14. The reaction vessel is equipped with suitable baffles 15. Heat is supplied by any suitable means (not shown) as, for example, by a fire box, by electrical resistance coils, or by low-frequency induction coils, as desired, over the length of the reaction vessel 1. Suitable valves 16, 17, 18, 19, 20, 21 and 22 are provided at various points to control the rate of flow.

In operation, aniline containing approximately five parts by weight of my new aniline-soluble catalyst comprising equimolar proportions of ferrous chloride and aniline hydrochloride is charged into the storage tank 3 through the line 23. The valves 12, 16, 21, and 22 are then closed and valves 17, 18, 19, and 20 are opened. The nitrogen admitted through the line 10 raises the pressure inside the apparatus to approximately 200 to 225 pounds per square inch. With the reaction chamber 1 heated to 300 to 325° C., the valve 16 is opened somewhat, and the valve 18 partly closed, whereby the pressure in the reaction vessel 3 is increased slightly over that in the other parts of the equipment. The aniline solution is therefore forced through the feed-line 2 into the reaction chamber 1, which becomes filled to the level indicated in the diagram. The rate of influx of the aniline solution is adjusted so that approximately two hours are required for the material to pass through the reaction vessel.

As the aniline solution containing the catalyst enters the reaction vessel 1, the reaction mixture begins to boil, the vapors rising and condensing in the reflux condensers 7, 8, and 9. The ammonia, which is split out during the reaction, is released from time to time, either by hand or automatically, by "cracking" the valve 12. As the reaction mixture proceeds down the length of the reaction vessel, the concentration of diphenyl amine increases until, at the time it passes into the trap 6, a substantial proportion of the amine has been converted to the desired product. The reaction product is removed from trap 6, through the valve 21, and the diphenyl amine is separated by suitable means. The recovered aniline may be recycled in the apparatus, if desired.

From the above example, it is readily apparent that other diaryl amines may be produced in substantially the same manner. Thus, for example, diaryl amines may be produced according to my process from various primary aromatic amines such as anisidine, the toluidines, xylidines, phenitidine, napthylamine, and the like. The procedure is essentially the same as that employed for diphenyl amine. If the starting material is normally solid, it may be heated above its melting point before it is charged into the storage tank 3. Other slight changes which may be necessary in each individual case will be readily apparent to those skilled in the art.

In the foregoing detailed description of my improved process, it is apparent that many variations may be made without departing from the spirit or scope of the invention. I therefore intend to be limited only in accordance with the following patent claims.

I claim:

1. The process for the production of diaryl amines, which comprises maintaining a reaction zone at reaction temperature and at a pressure at which the reactants are liquid at said reaction temperature, continuously passing through said reaction zone a liquid primary aryl amine and a catalyst consisting of a ferrous halide and a hydrohalide salt of a substance selected from the group consisting of ammonia, amines, and hydrazines, and continuously removing the reaction products from said reaction zone.

2. The process according to claim 1, in which diphenyl amine is produced and the primary aromatic amine consists of aniline.

3. The process according to claim 1, in which the catalyst is dissolved in the primary aromatic amine.

4. The process for the production of diphenylamine, which comprises maintaining a reaction zone at reaction temperature and at a pressure at which the reactants are liquid at said reaction temperature, continuously passing through said reaction zone liquid aniline and a catalyst consisting of a ferrous halide and a hydrohalide salt of a substance selected from the group consisting of ammonia, amines, and hydrazines, continuously removing the reaction products from said reaction zone, and separating the diphenylamine from said reaction mixture.

5. The process according to claim 4, in which the catalyst consists of ferrous chloride and aniline hydrochloride.

6. The process according to claim 4, in which the catalyst consists of about equimolar proportions of ferrous chloride and aniline hydrochloride.

7. The process for the production of diphenyl amine which comprises continuously passing through a corrosion-resistant reaction vessel, heated to reaction temperature and maintained at a pressure of at least 150 pounds per square inch, liquid aniline containing about 5% of an aniline-soluble catalyst consisting of equimolar proportions of ferrous chloride and aniline hydrochloride, continuously removing the reaction products from said reaction vessel, and separating the diphenyl amine from said reaction products.

8. The process according to claim 7, in which the reaction temperature is maintained at approximately 300 to approximately 350° C. and the pressure is maintained at approximately 150 to approximately 200 pounds per square inch.

9. The process for the production of diaryl amines, which comprises maintaining a reaction zone at reaction temperature and at a pressure at which the reactants are liquid at said reaction temperature, continuously passing through said reaction zone a primary aryl amine containing ferrous halide and a hydrohalide salt of a substance selected from the group consisting of ammonia, amines and hydrazines, and continuously removing the reaction products from said reaction zone.

10. The process according to claim 9, in which diphenyl amine is produced and the primary aromatic amine consists of aniline.

MARSHALL FRANCIS ACKEN.